UNITED STATES PATENT OFFICE.

SYDNEY MAKEPEACE WOOD, OF UPPER MONTCLAIR, NEW JERSEY.

FOOD COMPOSITION AND IN PROCESS OF PREPARING SAME.

1,311,844. Specification of Letters Patent. Patented July 29, 1919.

No Drawing. Application filed March 19, 1919. Serial No. 283,512.

*To all whom it may concern:*

Be it known that I, SYDNEY MAKEPEACE WOOD, a citizen of the United States, residing at Upper Montclair, in the county of Essex and State of New Jersey, have invented a new and useful Food Composition and in Processes of Preparing the Same, of which the following is a specification.

The object of my invention is the production of a food composition, or food product, which is palatable, nutritious, capable of retaining its food properties indefinitely without artificial preservatives.

My composition consists of a mixture of invert sugar syrup and cocoa with or without flavoring, milk, condiments, etc., as desired. I use the word "cocoa" in this specification and in the claims to designate all products of the nuts or beans of the cacao tree, and the form of the cocoa used is preferably the cacao nut or bean in a finely powdered form.

In preparing my food composition I use an invert sugar syrup inverted to such an extent as will produce an invert sugar syrup which will crystallize, that is, wherein the percentage of levulose and dextrose together aggregate substantially sixty-five per cent. or more of the solids in the syrup.

By "substantially", in the previous sentence and in the claims, I mean that the percentage of levulose and dextrose together shall aggregate anywhere between sixty per cent. and eighty-five per cent. of the solids in the syrup.

To this syrup I add cocoa (preferably in a finely powdered form) in substantially the percentage of one pound of cocoa to eleven pounds of inverted sugar syrup; the foregoing is the preferred proportion and character of the ingredients.

The foregoing are the character and proportions of the ingredients preferred for general uses. Good results may be obtained, however, when the percentage of cocoa to the entire mass is anywhere between five per cent. and fifty-five per cent. By "substantially", as used above and in the claims, I mean that the percentage of cocoa to the entire mass may be anywhere between five per cent. and fifty-five per cent. Water may be added in the proportion of ten per cent. to thirty-three per cent. of water to the mass, and in using the word "substantially" in the claims in reference to water I mean anywhere within these proportions; twenty per cent. of water in the mass produces good results.

After putting together the syrup and powdered cocoa, the mass is thoroughly mixed, and then brought to a boiling, or nearly boiling, temperature, and there maintained for a short period, and then preferably rapidly cooled. During the heating, I keep the mass thoroughly stirred. In practice I have found that the best results are obtained when the mass is maintained near the boiling temperature for a period of forty to sixty minutes, although good results may be obtained when such temperature is maintained for a much shorter period (three or four minutes), or for a longer period, (practically indefinitely), provided the mass is kept from burning.

My composition is highly palatable and nutritious, will keep indefinitely without artificial preservatives, and my process of manufacture markedly develops the innate flavor of the cocoa.

Flavoring, seasoning, milk, milk products, nut meats, condiments, etc., may be added if and as desired as, or just before, or after the mass is cooled.

I claim:

1. A food composition of pasty consistency made up of a mixture of invert sugar syrup and cocoa, in which the proportions of levulose and dextrose to the syrup together are substantially seventy per cent. of the solids in the syrup and the proportion of cocoa to the syrup is substantially one pound of cocoa to eleven pounds of invert syrup.

2. A food composition of pasty consistency made up of a mixture of invert sugar syrup and cocoa in which the proportions of levulose and dextrose in the syrup together are substantially seventy per cent. of the solids in the syrup, and wherein the proportion of cocoa to the syrup is substantially one pound of cocoa to eleven pounds of invert syrup, and wherein the proportion of water in the mass is substantially twenty per cent.

3. The process of making a food product which consists of inverting sugar to such an extent that the dextrose and levulose together in the syrup are substantially seventy per cent. of the solids in the syrup, then mixing said invert syrup with cocoa in the proportion of substantially one pound of cocoa to eleven pounds of syrup, then heating the mixture to substantially the boiling point, stirring the mixture during the heating, and then cooling it.

4. A process of making a food product which consists of inverting sugar to such an extent that the dextrose and levulose together in the syrup are substantially seventy per cent. of the solids in the syrup, then mixing the said syrup with cocoa in the proportion of substantially one pound of cocoa to eleven pounds of syrup, then heating the mixture and maintaining such heating for a period of at least three minutes, stirring the mixture during the heating, and then cooling it.

SYDNEY MAKEPEACE WOOD.

Witnesses:
SAMUEL S. WATSON,
F. A. SPAETH.